(12) United States Patent
Dirnberger et al.

(10) Patent No.: US 8,491,363 B2
(45) Date of Patent: Jul. 23, 2013

(54) AIR DAMPER SYSTEM FOR DOMESTIC COOLING AND/OR FREEZING

(75) Inventors: Albert Dirnberger, Neunburg v.W. (DE); Thomas Neumann, Konnersreuth (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 1121 days.

(21) Appl. No.: 12/357,473

(22) Filed: Jan. 22, 2009

(65) Prior Publication Data
US 2009/0188273 A1 Jul. 30, 2009

(30) Foreign Application Priority Data
Jan. 23, 2008 (DE) .......................... 10 2008 005 699

(51) Int. Cl.
*F24F 7/00* (2006.01)
*A62C 2/18* (2006.01)

(52) U.S. Cl.
USPC .......................................... 454/333; 454/369

(58) Field of Classification Search
USPC .................. 454/333, 369; 251/264–267, 305, 251/308, 129.12
See application file for complete search history.

(56) References Cited

U.S. PATENT DOCUMENTS

| 3,248,893 A | 5/1966 | McLean |
| 4,644,239 A | 2/1987 | Yoshikawa et al. |
| 5,829,267 A | 11/1998 | Fromm et al. |
| 5,876,014 A * | 3/1999 | Noritake et al. .......... 251/129.12 |
| 6,582,293 B1 * | 6/2003 | Siniarski et al. ............... 454/155 |
| 2002/0175305 A1 * | 11/2002 | McCabe et al. .......... 251/129.12 |
| 2005/0189184 A1 * | 9/2005 | Osvatic et al. ................ 188/138 |

FOREIGN PATENT DOCUMENTS

DE 10 2006 001 679 A1 7/2007

* cited by examiner

*Primary Examiner* — John K Fristoe, Jr.
*Assistant Examiner* — Kevin Barss
(74) *Attorney, Agent, or Firm* — Robert R Deleault, Esq.; Mesmer & Deleault, PLLC

(57) ABSTRACT

An air flap device (10) for a cooling or/and freezing appliance of kitchen equipment comprises an air flap (18) which is mounted so that it can pivot about a first axis of rotation (20) between an open position and a closed position, uncovers an air passage opening for the passage of air in the open position and at least substantially blocks the air passage opening against the passage of air in the closed position, and a motor-driven flap operating mechanism for pivoting the air flap. According to the invention, the flap operating mechanism comprises a rotary member (26) which is disposed so as to be driven about a second axis of rotation (28) as well as a separate force transmission member (32) which serves to transmit force between the rotary member and the air flap, is coupled to the rotary member at a point lying eccentrically to the second axis of rotation and is coupled to the air flap (18) at a point lying at a distance from the first axis of rotation.

16 Claims, 5 Drawing Sheets

AIR DAMPER SYSTEM FOR DOMESTIC COOLING AND/OR FREEZING

Figure 1:
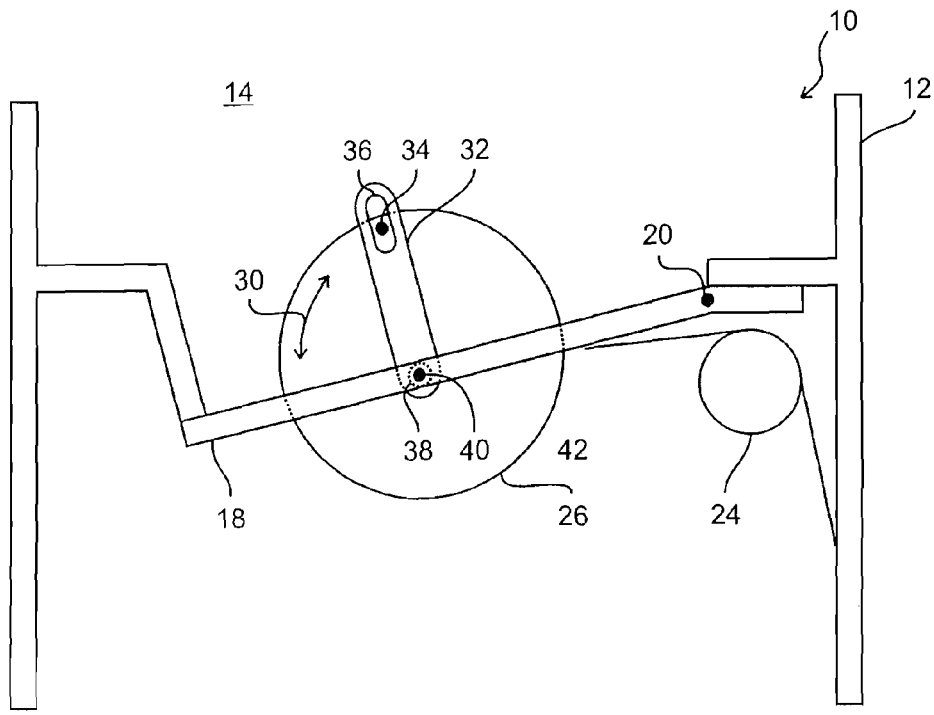

The invention relates to an air flap device for a cooling or/and freezing appliance of kitchen equipment, comprising an air flap which is mounted so that it can pivot about a first axis of rotation between an open position and a closed position and uncovers an air passage opening for the passage of air in the open position and substantially blocks the air passage opening against the passage of air in the closed position, and a motor-driven flap operating mechanism for pivoting the air flap.

An air flap device of the above type is already known from DE 10 2006 001 679 A1. Air flap devices of the type considered here are used to control the supply of cold air to a cooling chamber of a cooling or/and freezing appliance for kitchens. More detailed information with regard to the purpose of use and the installation location of the air flap device can be found in paragraph [0002] of the above-mentioned DE 10 2006 001 679 A1. Reference is hereby explicitly made to the illustrations in the latter.

U.S. Pat. No. 4,644,239 shows in its FIG. 14 a pivotably mounted air flap unit which is composed of the actual air flap and an arm firmly attached thereto. The pivot axis of the air flap unit lies in the region of the free end of the arm. In its centre part the arm has a slotted hole which extends in the longitudinal direction of the arm and in which a pin disposed eccentrically on a rotary disc engages. The rotary disc is driven by a drive motor. The pin-slotted hole pair converts a rotational movement of the rotary disc into a pivotal movement of the air flap unit.

In contrast to this, an air flap device of the type initially indicated is distinguished according to the invention by the fact that its flap operating mechanism comprises a rotary member which is disposed so as to be driven about a second axis of rotation as well as a separate force transmission member which serves to transmit force between the rotary member and the air flap, is coupled to the rotary member at a point lying eccentrically to the second axis of rotation and is coupled to the air flap at a point lying at a distance from the first axis of rotation. The force transmission member in the form of a separate component acts in the manner of a connecting rod and converts the rotational movement of the rotary member into a pivotal movement of the air flap. The coupling point at which it is mechanically coupled to the rotary member circles the axis of rotation (second axis of rotation) of the rotary member when the latter rotates. This means that it is expedient to provide a mobile coupling between the rotary member and the force transmission member, for instance in the manner of a swivel joint. When the rotary member is driven the coupling point at which the force transmission member is coupled to the air flap follows an arcuate path whose arc length corresponds to the pivot angle range of the air flap. Mobility of the coupling is also expedient in this case, again in the form of rotational flexibility, for instance.

The second axis of rotation preferably extends substantially parallel to, although at a distance from, the first axis of rotation. However other designs, in which the two axes of rotation are at a relative inclined position, in particular orthogonal position, to one another, are of course not excluded.

The force transmission member can be constructed so as to be thrust- and tension-stiff in the direction of a connecting line between the coupling points on the rotary member and air flap side. In this case it can be formed as an elongate flat body, for example.

According to one variant, the force transmission member can have tensile or/and thrust flexibility in the direction of a connecting line between the coupling points on the rotary member and air flap. It is conceivable, for instance, for the force transmission member to have a helical spring whose spring axis extends substantially in the direction of the connecting line between the coupling points. It is then conceivable to transmit thrust via the force transmission member as a result, for example, of the helical spring becoming blocked, i.e. its consecutive coils coming to lie against one another.

The above tensile or/and thrust flexibility of the force transmission member can in particular be present just in phases, i.e. just during a part of the rotational movement of the rotary member. The force transmission member then behaves in a tension-proof or thrust-proof manner in the remaining parts of the rotational movement of the rotary member.

For example, the force transmission member can be formed, such that it behaves in an at least mainly thrust-stiff manner when the air flap is pivoted in one pivoting direction in order to transmit the force from the rotary member to the air flap through thrust, but that it behaves in a tensile-flexible manner when the air flap is pivoted in the opposite direction, so that a tensile force which increases in proportion to the degree of elongation of the force transmission member is exerted on the air flap.

The coupling of the force transmission member to the rotary member or/and the air flap can have mobility of play in the direction of a connecting line between the coupling points on the rotary member and air flap side. This allows component and assembly tolerances, which are inevitable in practice, to be compensated. The mentioned motional play can guarantee a constantly tight closure of the air flap, in particular in interaction with suitable spring biasing means. Furthermore, a phase in which the rotary member moves, although no force is exerted on the air flap can be achieved through a coupling between the force transmission member and the rotary member which entails play. This phase can be used to "pick up momentum", so to speak, that is a drive motor driving the rotary member can firstly be set in motion utilising the motional play, in spite of a possibly frozen-up air flap. When the play is used up, the motional impulse attained by the motor can suffice to intermittently or suddenly break up an ice formation on the air flap, which is possible in both positions of the air flap. Consequently the drive motor does not have to start from standstill against a resistance caused by ice formation, but can first gain momentum before the rotation of the rotary member causes the air flap to pivot appreciably. This spares the drive motor.

The force transmission member can be coupled to the rotary member or/and the air flap through a pin-slotted hole pair, for example, in order to produce the motional play.

The air flap device according to the invention preferably has a spring-elastic biasing arrangement which in one of the two flap positions, in particular the closed position, exerts a bias on the air flap in the direction away from the other position. In this respect the biasing arrangement can comprise a biasing element which is active between the air flap and a flap housing supporting the air flap so that it can rotate about the first axis of rotation or/and a biasing element which is active between the air flap and the force transmission member or/and a biasing element which is active between the force transmission member and the rotary member.

As a source of mechanical driving force, the flap operating mechanism can comprise an electric drive motor which drives the rotary member about the second axis of rotation and which is designed for operation in opposite directions of rotation. In this embodiment the air flap can be operated in both directions of rotation of the drive motor. In particular in conjunction with a coupling of the force transmission member to the rotary member or/and the air flap which entails play, this can be used, when the air flap is frozen up, to let the drive motor run in an alternating direction of rotation in succession if a first impulse of the force transmission member on the air flap is insufficient to loosen the ice formation.

Generally speaking, it is of course possible to alternatively use n electric drive motor which is designed for operation in just one direction of rotation.

The flap operating mechanism can comprise control surface means disposed in a fixed position relative to the coupling point on the rotary member side for joint movement with this about the second axis of rotation in order to control a mechanically operable switching member by means of an electrical switch. Further illustrations with regard to the structure and function of the control surface means and of the switch can be found in the above-mentioned DE 10 2006 001 679 A1 and in particular paragraphs [0012] to [0019] of the latter, the flap operating element of which is to be replaced by the rotary member here and the flap engagement section of which is to be replaced by the coupling point on the rotary member side.

Figure 2:
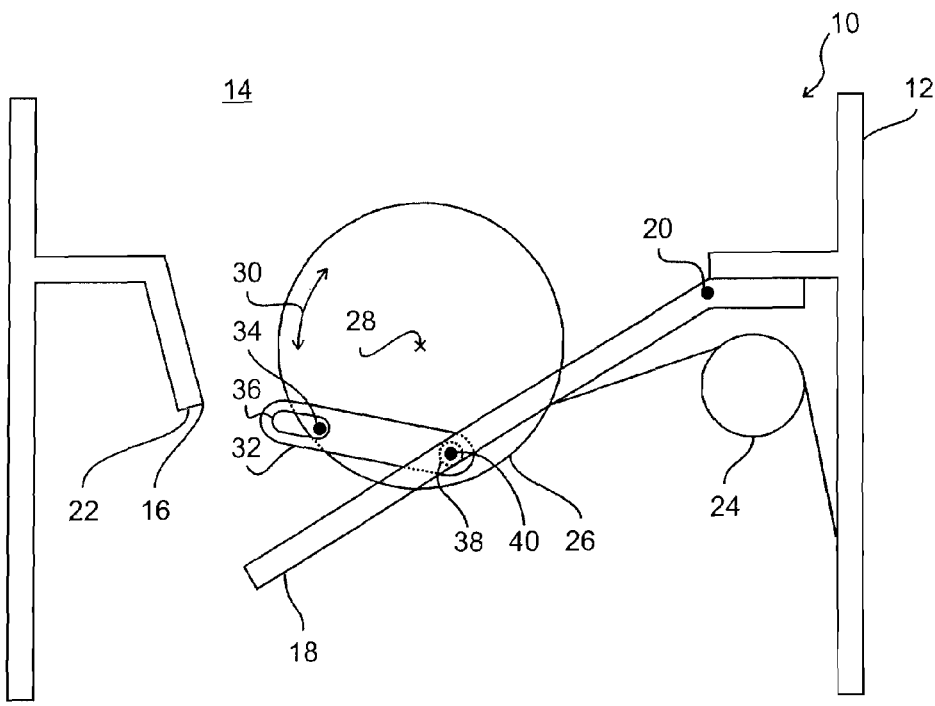
Figure 3:
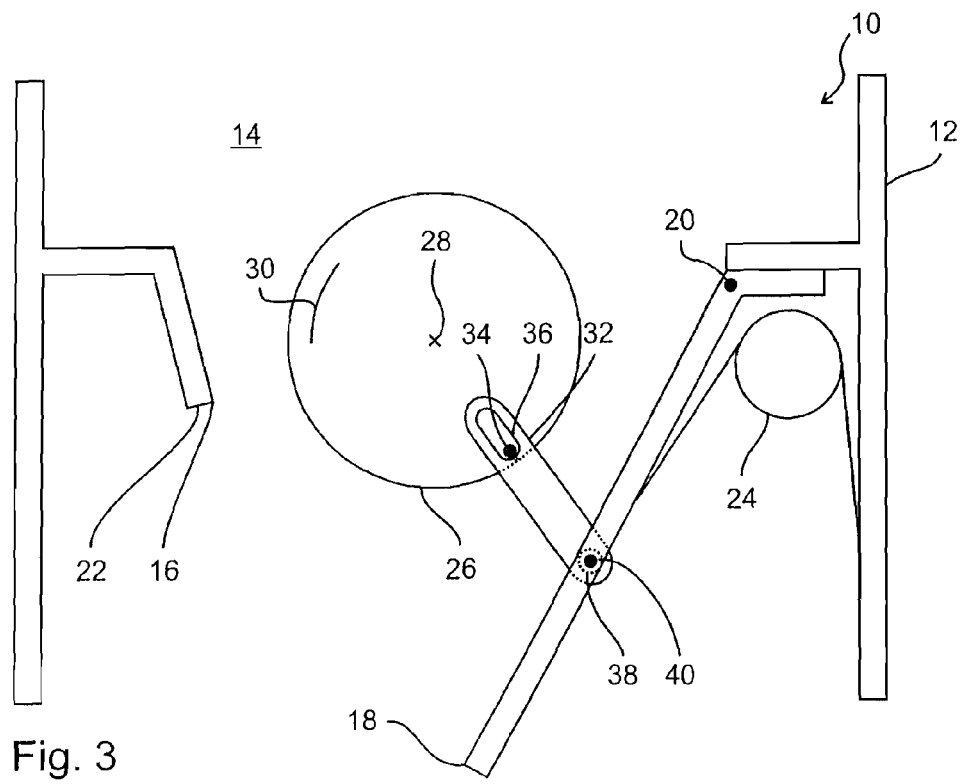
Figure 4:
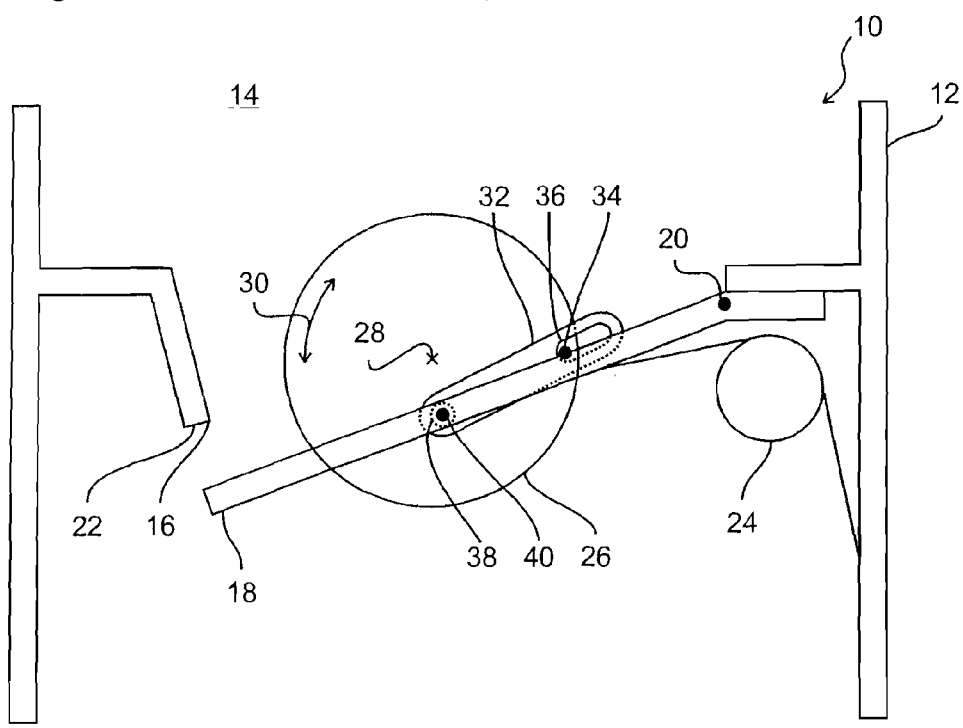
Figure 5:
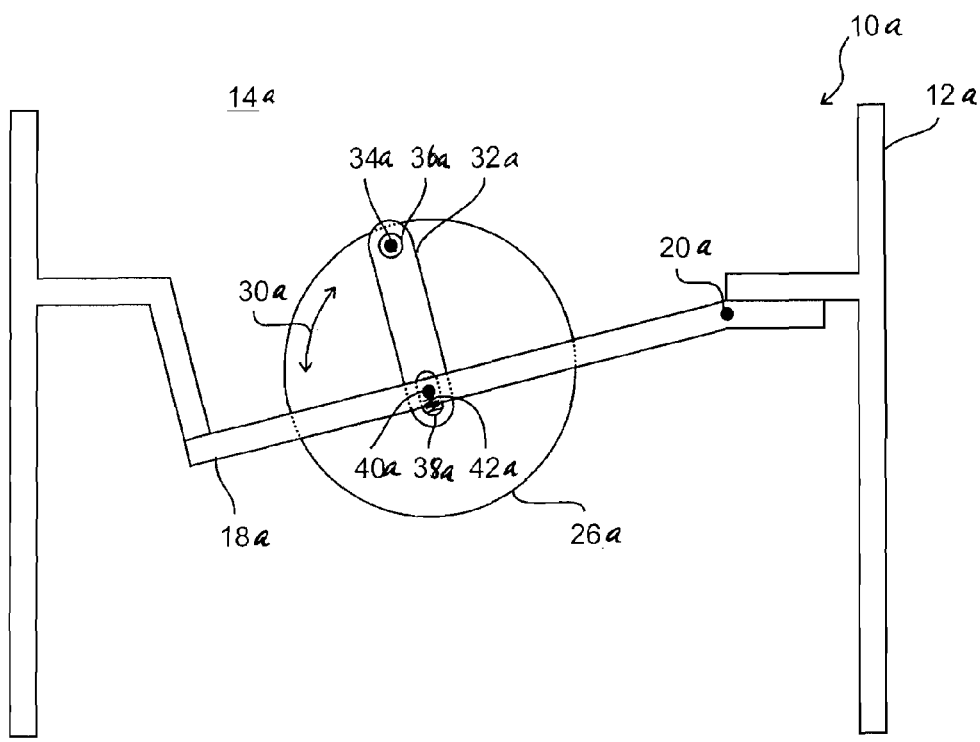
Figure 6:
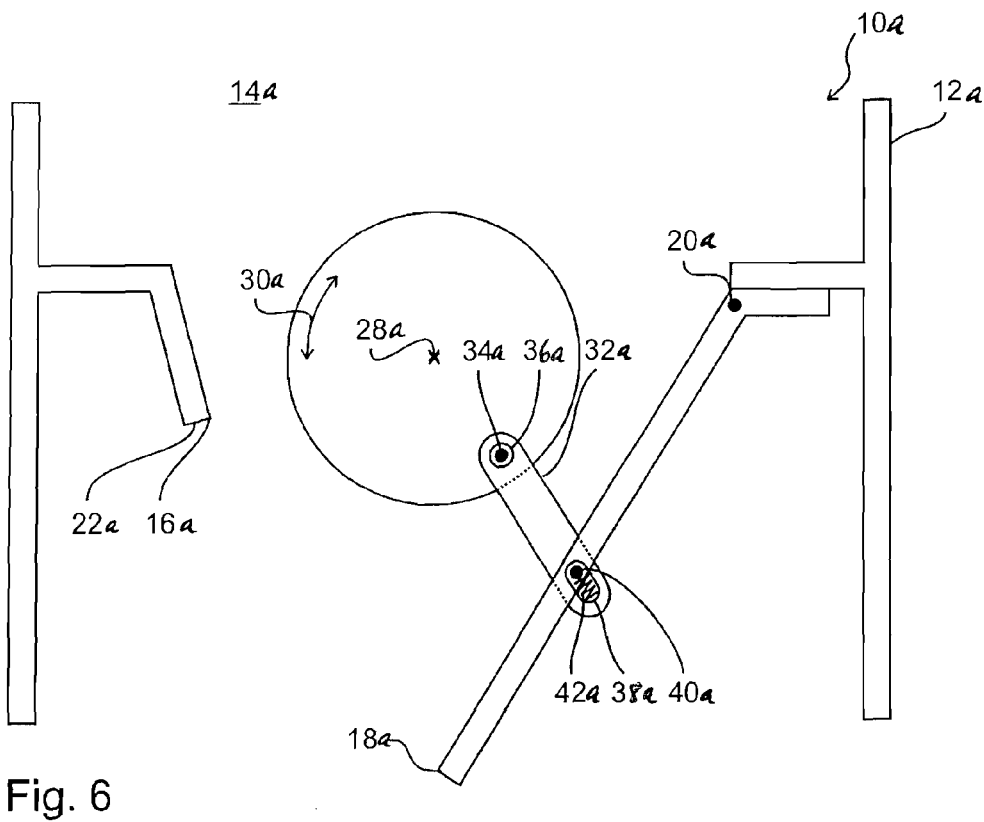
Figure 7:
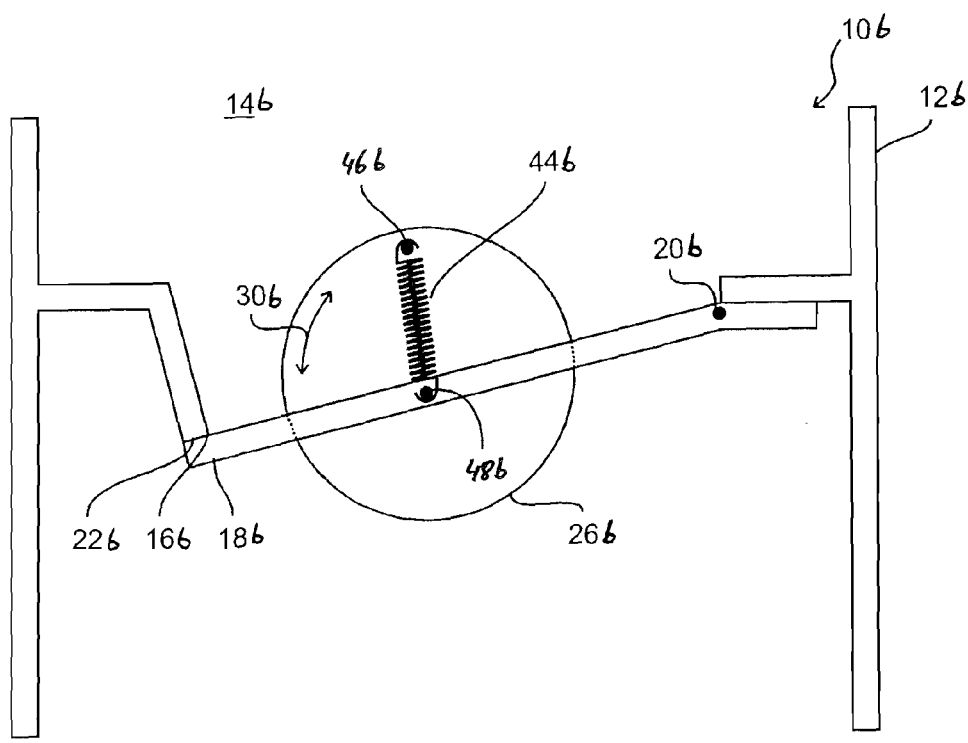
Figure 8:
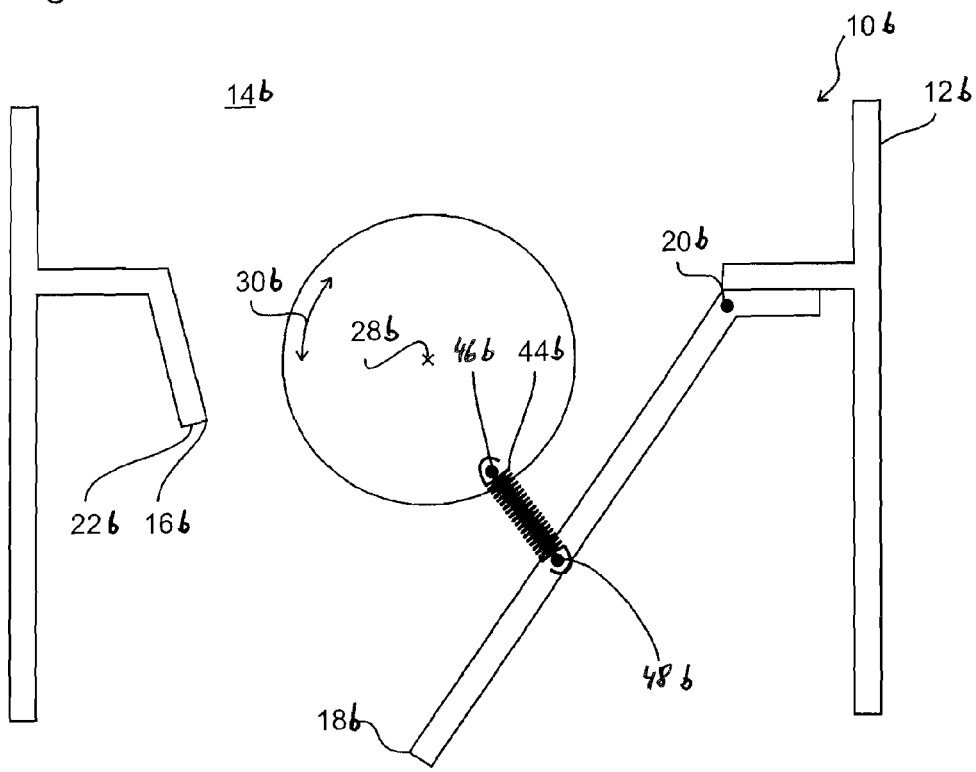
Figure 9A:
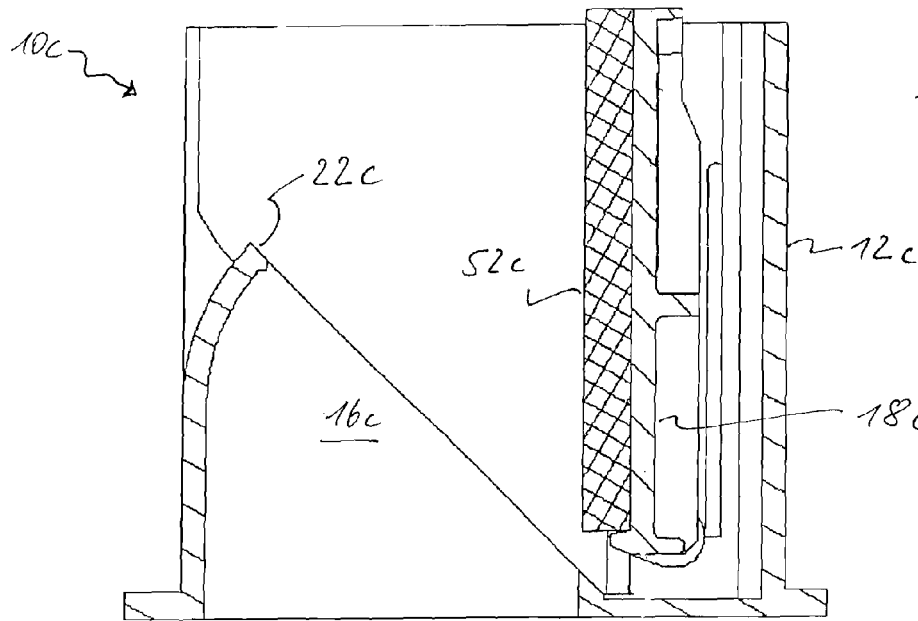
Figure 9B:
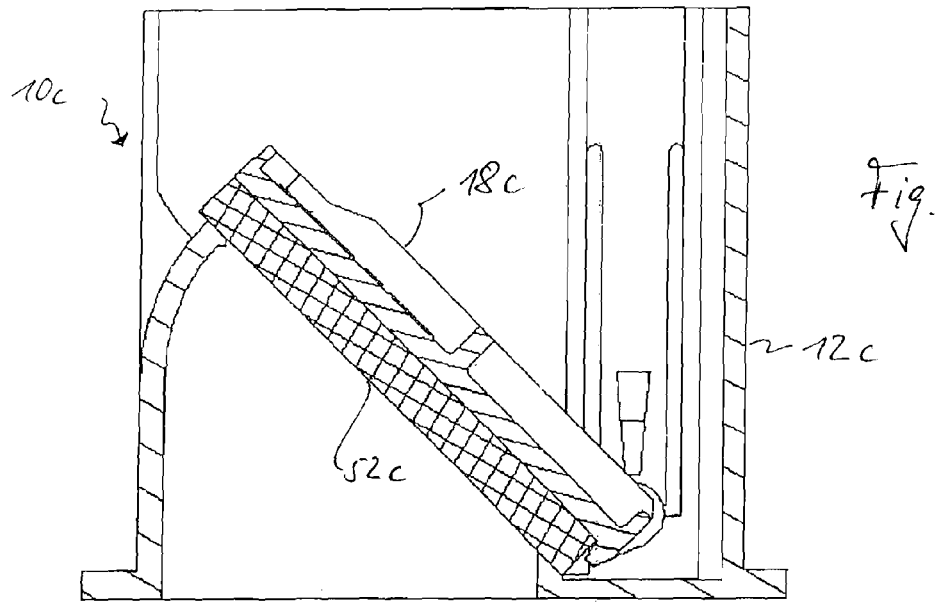

The invention is illustrated further in the following on the basis of the accompanying drawings, which represent:

FIG. 1 schematically a first embodiment of an air flap device according to the invention in a closed position of an air flap, FIGS. 2 to 4 the device of FIG. 1 in different pivoting phases of the air flap, FIGS. 5 and 6 schematically a second embodiment of an air flap device according to the invention in a closed and an open position of an air flap, FIGS. 7 and 8 schematically a third embodiment of an air flap device according to the invention in a closed and an open position of an air flap, FIGS. 9a and 9b a further embodiment of an air flap device in an open and a closed position.

Reference is firstly made to FIGS. 1 to 4. The air flap device which is shown there and is marked as a whole by 10 is provided for installation in a cooling or/and freezing appliance for cool storage and freezing of food. In the installed state it permits optional opening and closing of a cold air duct 14, through which cold air which is produced or available can be routed into a cooling chamber of the appliance. The air flap device 10 comprises a housing arrangement (flap housing) 12 which defines the said cold air duct 14 at least over a part of its length. The housing arrangement 12 forms a passage opening 16 which separates an upper part of the cold air duct 14 from a lower part and can be closed or uncovered as required by means of an air flap 18.

The air flap 18 is mounted on the flap housing 12 so that it can pivot about a first axis of rotation 20. In this respect it can move between a closed position shown in FIG. 1 and an open position shown in FIG. 3. FIGS. 2 and 4 show intermediate positions of the air flap 18 through which it can pass upon opening and closing. In the closed position the air flap 18 lies against an opening edge 22 of the passage opening 16 and closes this at least approximately tightly.

A biasing spring 24 which is active between the flap housing 12 and the air flap 18 biases the air flap 18 in the direction of its closed position. Generally speaking, any desired type of spring can be used for the biasing spring 24. In the example which is shown it is formed by a leg spring whose ends are supported on the flap housing 12 and the air flap 18.

An electromotive flap operating mechanism serves to operate the air lap 18, that is to transfer it from the closed position to the open position and vice versa, this comprising a rotary member 26 which is formed in the shape of a disc, for example, and can be driven by means of an electric drive motor, which is not represented in detail in FIGS. 1 to 4, for rotation about a further (second) axis of rotation 28. The axis of rotation 28 extends at a distance from the first axis of rotation 20 substantially parallel to the latter. The rotary member 26 is mounted so that it is free to rotate in both directions of rotation without limits, as indicated by a double arrow 30. It is preferably disposed next to the air flap 18 at an axial distance from the latter, so that it does not reach into the pivot space of the air flap 18 and obstruct the movement thereof.

The flap operating mechanism also comprises a force transmission member 32 which is separate from the rotary member 26 and the air flap 18 and is coupled in a mobile manner to both. In the embodiment which is shown this is formed as a one-part, elongate flat body which lies substantially parallel to the disc plane of the rotary member 26. It serves to transmit tensile and thrust forces from the rotary member 26 to the air flap 18. When viewed in the axial direction, the force transmission member 32 lies between the rotary member 26 and the air flap 18, although also axially outside of the pivot space.

The point at which the force transmission member 32 is coupled to the rotary member 26 lies eccentrically to the second axis of rotation 28 on the disc side of the rotary member 26 which faces the air flap. This coupling point also circles the axis of rotation 28 when the rotary member 26 rotates. The point at which the force transmission member 32 is coupled to the air flap lies on the flap edge which faces the rotary member at a radial distance from the first axis of rotation 20. The force transmission member 32 works in a similar manner to a connecting rod and converts the rotational movement of the rotary member 26 into a pivotal movement of the air flap 18. In so doing the force transmission member 32 moves along the disc plane of the rotary member 26.

In the example which is shown the mobile coupling of the force transmission member 32 to the rotary member 26 and the air flap is in each case formed by a pin-hole pair, one of which, by forming the hole as a slotted hole, provides motional play which can be used to compensate for component and assembly tolerances. On its disc side which faces the air flap the rotary member 26 specifically bears an axially projecting, eccentric pin 34 which engages in a slotted hole 36 of the force transmission member 32. An axial pin 40 at the same time projects from the air lap 18 at the flap edge thereof which faces the rotary member and engages in a further hole 38 of the force transmission member 32. However the hole 38 is not in the form of a slotted hole and therefore accommodates the pin 40 substantially without transverse play. The axis of the pin 40 is, moreover, radially staggered with respect to the second axis of rotation 28.

The longitudinal extent of the slotted hole 36 of the force transmission member 32 extends substantially parallel to an imaginary connecting line between the two pins 34, 40. Expressed in more general terms, the hole 36 is elongate in the direction of an imaginary connecting line between the points at which the force transmission member 32 is coupled to the rotary member and the air flap, in other words in the direction in which force is transmitted via the force transmission member 32. In the embodiment which is shown in FIGS. 1 to 4 this connecting line extends parallel to the geometrical longitudinal axis of the force transmission member 32, although this does not represent a necessary feature. On the contrary, the force transmission member 32 can have any desired contour shapes other than those which are represented. The length of the slotted hole 36 is dimensioned so that tolerances relating to the dimensions or the relative position of different components, which are inevitable in practice, can be compensated. However the pin 34 is seated substantially without play in the slotted hole 36 in the transverse direction.

It is of course possible in a modification to form the hole 38 as a slotted hole instead of the hole 36 and to change round the arrangement of the pins and the holes at the force transmission member 32, the rotary member 26 and the air flap 18.

The relative position of the rotary member 26, force transmission member 32 and air flap 18 which is illustrated in FIG. 1 corresponds to a first dead centre position of the rotary member 26. In this dead centre position the pin 34 is at a distance from the inner edge of the slotted hole 36. The motional play of the pin 34 in the slotted hole 36 guarantees tight closure of the air flap 24 by the biasing spring 24, in spite of any manufacturing tolerances. This play also results in the possibility of the rotary member 26 firstly "picking up momentum" substantially without resistance when rotating from the first dead centre position, irrespective of in which direction of rotation, before the pin 34 strikes against the inner hole edge and a thrust force is then transmitted to the air flap 18 via the force transmission member 32. In this "no-load phase" only the force transmission member is carried along (this rotates about the axis of the pin 40), although no force is yet exerted on the air flap 18.

The equivalent applies when the hole 38 is formed as a slotted hole instead of the hole 36.

As soon as the motional play in the structure consisting of the rotary member 26, force transmission member 32 and air flap 18 is overcome, each further rotation of the rotary member 26 causes the air flap 18 to pivot. Assuming that the rotary member rotates in the anticlockwise direction, the intermediate position according to FIG. 2, in which the air flap 18 is partly open, is reached first. Further rotation finally achieves the open position according to FIG. 3, in which the air flap 18 is open to a maximum and the rotary member 26 occupies a second dead centre position. The second dead centre position is at least approximately 180 degrees removed from the first dead centre position.

Starting from the open position according to FIG. 3, the air flap 18 can be closed again by reversing the direction of rotation of the rotary member 26, so that the return to the closed position takes place via the intermediate position according to FIG. 2. The rotary member 26 can alternatively be rotated further in the same direction of rotation beyond the second dead centre position. This then results in the intermediate position according to FIG. 4, from which the closed position according to FIG. 1 is approached first. In each case the return to the closed position is assisted by the force of the biasing spring 24. As soon as the air flap 18 strikes against the edge 22 of the housing opening 16, the engagement between the pin 34 and the slotted hole 36 becomes force-free again. The biasing spring 24 applies a force which might still be necessary to tightly close the air flap 18 and pushes the air flap 18 firmly against the edge 22.

Continued rotation of the rotary member 26 about the axis of rotation 26 in each of the two directions of rotation can accordingly cause the air flap 18 to repeatedly open and close.

Apart from the free choice of direction of rotation for the rotary member 26, the drive motor and the mechanical drive connection between the motor and the rotary member 26 expediently allows the latter to be driven in both directions of rotation. This can advantageously be used in order to reverse the drive direction of the rotary member 26 if it meets with too great a resistance in one direction of rotation, for instance because the air flap 18 is frozen up at the opening edge 22 in the closed position shown in FIG. 1 or in the open position shown in FIG. 3. The reversal of the direction of rotation then allows the rotary member to repeatedly pass through the first dead centre position in an alternating direction, so that the rotary member 26 can repeatedly "strike" or "knock" against the air flap 18 with a continual change in the direction of rotation. An ice formation on the air flap 18 can in this way be broken up better. Depending on the speed with which the drive motor can start, the rotary member 26 can then also be given a greater or lesser motional impulse which can be used to intermittently break up an ice formation.

However it is not just ice formations in the closed position which can be broken up in this way. The air flap 18 can also freeze up in the open position, bearing in mind that the open times of the air flap 18 can in practice easily be several minutes. At temperatures distinctly below freezing point this time can easily suffice to cause the air flap to ice up in the open position. The force of the biasing spring 24 may not be sufficient to break up and to loosen ice formations of this kind. This is remedied by the connecting rod connection between the rotary member 26 and the air flap 18, which can transmit not just thrust forces, but also tensile forces from the rotary member to the air flap.

High functional reliability of the air flap device 10 can thus be guaranteed as a whole even under the comparatively harsh conditions of a cooling or/and freezing appliance.

In the additional figures the same or equally acting elements are marked with the same reference numbers as before, although supplemented by a lowercase letter. Only differences from or supplements to that which is mentioned above are discussed in the following in order to avoid repetitions.

There is no biasing spring which is active between the flap housing and the air flap in the embodiment of FIGS. 5 and 6. In order nevertheless to guarantee tight closure of the air flap 18a, a spring element 42a is provided which is active between the air flap 18a and the force transmission member 32a and which, when the air flap 18a is in the closed position (FIG. 5), exerts a biasing force on this which holds the air flap 18a in close contact with the opening edge 22a. The spring element 42a may be formed as a helical spring, as a leaf spring or as an elastomer body, for example. The spring element 42a can be accommodated in a space-saving manner in the slotted hole of one of the two pin-hole pairs via which the force transmission member 32a is coupled to the rotary member 26a and the air flap 18a.

Unlike the embodiment of FIGS. 1 to 4, in the example which is shown the hole 38a of the pin-hole pair on the air flap side is formed as a slotted hole, while the hole 36a affords essentially no mobility of play for the pin 34a. The spring element 42a is in this case inserted in the slotted hole 38a so that it sits between the pin 40a and the outer hole edge (the outer hole edge lies at the longitudinal end of the slotted hole 38a which is further away from the coupling point on the rotary member side). Here the spring element 42a acts as a compression spring which pushes the pin 40a in the direction of the inner edge of the slotted hole 38a. The geometry of the structure consisting of the rotary member 26a, force transmission member 32a and air flap 18a is such that, when the air flap 18a is closed, this strikes against the opening edge 22a even before the rotary member 26a reaches the first dead centre position illustrated above. The rotary member 26a has to be rotated a certain distance further until this dead centre position is reached, in which case the pin 40a travels in the slotted hole 38a from the inner hole edge in the direction of the outer hole edge against the force of the spring element 42a. This is accompanied by compression of the spring element 42a, which ensures that the air flap 18a is pressed tightly against the opening edge 22a as desired.

It is of course alternatively possible to accommodate the spring element 42a in the hole 36a, which is then to be formed as a slotted hole, on the rotary member side. In this case the spring element 42a would be active between the force transmission member 32a and the rotary member 26a, although would likewise cause the air flap 18a to be biased in the closed position. The advantage of the configuration with a biasing element seated in one of the pin holes is that the drive motor does not have to work against any biasing force in any phase in which the air flap is not in contact with the opening edge of the flap opening. These phases constitute the major part of the rotational movement of the rotary member.

Whereas the previous embodiments were based on a rigid force transmission member, FIGS. 7 and 8 illustrate an embodiment with a force transmission member 32b which is flexible in the force transmission direction. Here this is formed by a helical spring 44b which is fixed with one of its ends to a suspension point 46b on the rotary member side and with its other end to a suspension point 48b on the air flap side. The spring axis therefore extends substantially parallel to the force transmission direction. The coupling of the helical spring 44b to the rotary member 26b and the air flap 18b expediently permits at least limited articulated mobility in order to prevent twisting and frictional losses. At the same time appropriate measures are to be taken to ensure that the helical spring 44b does not buckle when the air flap 18b is opened.

In order to transmit forces when opening the air flap 18b, the thrust stiffness of the helical spring 44 can in particular be utilised after its coils have become blocked. This situation is represented very clearly in FIG. 8. It is of course also conceivable to have more complex formations in which, in addition to a helical spring, the force transmission element 32b also has a rigid force transmission body via which the thrust forces are transmitted without the spring becoming blocked in the process. It is equally possible for sufficient thrust forces to be transmitted solely by compressing the spring 44b in the elastic range, without the spring 44b necessarily having to become blocked.

On the other hand, the capacity of the helical spring 44b to transmit tensile forces is used to close the air flap 18b. In the closed position according to FIG. 7 the spring 44b is preferably subjected to tension, so that a biasing force acts on the air flap 44b to ensure tight closure. If the flap 44b has frozen up in the open position according to FIG. 8, the rotary member 26b can still be moved in the direction of the closed position on account of the flexibility of the spring 44b. In this connection the spring 44b undergoes elongation which is accompanied by an increasing tensile force on the air flap 18b. A large force can also be built up in this way without any significant starting resistance for the drive motor in order to break up the ice formation on the air flap 18b.

In the embodiment of FIGS. 9a, 9b an elastic cushion 52c is attached to the air flap 18c, which cushion lies against the opening edge 22c of the air passage opening 16c all round under a greater or lesser degree of compression when the air flap 18c is in the closed position and thus blocks the air passage opening 16c in a substantially airtight manner. The elastic cushion 52c can consist, for example, of a foamed material or alternatively of a rubber material. Unlike the representation in FIGS. 9a, 9b, it can of course be in the form of an annular cushion which is essentially only provided at those points of the air flap 18c which come to lie on the opening edge 22c of the air passage opening 16c. The desired tightness of the closure of the opening 16c is ensured by the compression of the cushion 52c when the air flap 18c is in the closed position.

Any of the solutions shown in the previous figures can be used to drive the air flap 18c of the embodiment of FIGS. 9a, 9b. However it is to be pointed out that, on account of the presence of the cushion 52c and the compression of the latter when the air nap 18c is in the closed position, the drive mechanism can be constructed in a particularly simple manner. It is thus possible, for example, to dispense with motional play between the force transmission member on the one hand and the rotary member as well as the air flap on the other. Motional play of this kind is guaranteed in the embodiments of FIGS. 1-6 by the pin-hole pair 34, 36 and 38a, 40a, respectively, provided in these. Tight closure of the air flap 18c can also be obtained in the embodiment of FIGS. 9a, 9b without motional play of this kind, in spite of any assembly and manufacturing tolerances. It is also possible to dispense with a biasing element which biases the air flap 18c in the direction of its closed position, as is effected, for example, by the biasing spring 24 in FIGS. 1-4. It is equally possible to dispense with a spring element which is active between the force transmission member and the air flap or between the force transmission member and the rotary member, such as, for example, the spring element 42a of FIGS. 5 and 6. Furthermore, in the case of the embodiment of FIGS. 9a, 9b the force transmission member can be constructed so as to be inherently completely thrust-stiff and tension-stiff, unlike, for example, the variant of FIGS. 7 and 8. In this respect the flap operating mechanism in the embodiment of FIGS. 9a, 9b can in the simplest case comprise an inherently stiff, preferably one-part force transmission member which is rotatably coupled to the air flap and to the rotary member in each case, although has substantially no motional play of any kind transversely to the respective axes of rotation.

In all the embodiments so far illustrated control surfaces, which are not represented in detail, can be formed on the rotary member on its disc side which is remote from the air flap, which surfaces serve to control an electrical switch which in turn is part of an electrical control circuit for controlling the power supply to the drive motor. The control surfaces are preferably formed with symmetrical directions of rotation in relation to a rotation about the axis of the rotary member, i.e. they have the same contour path in both angular directions. The control surfaces can alternatively be disposed on a control surface carrier element which is separate from the rotary member yet is disposed for joint rotation with the latter. More detailed illustrations with regard to the control surfaces as well as their interaction with the electrical switch can be found in the initially mentioned DE 10 2006 001 679 A1 and there in particular the statements in paragraphs [0034] to [0045] in conjunction with FIGS. 3 and 4 thereof. These source references are hereby explicitly included by reference.

The invention claimed is:

1. An air flap device for a cooling or/and freezing appliance of kitchen equipment, the device comprising:
   an air flap which is mounted so that it can pivot about a first axis of rotation between an open position and a closed position, wherein the air flap uncovers an air passage opening for the passage of air in the open position and at least substantially blocks the air passage opening against the passage of air in the closed position; and
   a motor-driven flap operating mechanism for pivoting the air flap, the flap operating mechanism comprising:
      a rotary member which is disposed so as to be driven about a second axis of rotation, wherein the rotary member is free to rotate without limits and when circling the second axis of rotation alternately passes through two dead centre positions, in one of which the air flap is in its open position and in the other of which the air flap is in its closed position; and a separate force transmission member, which serves to transmit force between the rotary member and the air flap, is coupled to the rotary member at a point lying eccentrically to the second axis of rotation and is coupled to the air flap at a point lying at a distance from the first axis of rotation wherein the coupling of the force transmission member to the rotary member and/or the air flap is accomplished through a pin-slotted hole pair to provide mobility of play in the direction of a connecting line between the coupling points on the rotary member and air flap side.

2. The air flap device according to claim 1, wherein the two dead centre positions are at least approximately a 180° rotation of the rotary member removed from one an other.

3. The air flap device according to claim 1, wherein the second axis of rotation extends substantially parallel to, although at a distance from, the first axis of rotation.

4. The air flap device according to claim 1, wherein the force transmission member is coupled to the rotary member and the air flap in each case with rotational flexibility.

5. The air flap device according to claim 1, wherein the force transmission member is constructed so as to be thrust- and tension-stiff in the direction of a connecting line between the coupling points on the rotary member and air flap side.

6. The air flap device according to claim 5, wherein the force transmission member is formed as an elongate flat body.

7. The air flap device according to claim 1, wherein the force transmission member has tensile or/and thrust flexibility in the direction of a connecting line between the coupling points on the rotary member and air flap.

8. The air flap device according to claim 7, wherein the force transmission member has a helical spring whose spring axis extends substantially in the direction of the connecting line between the coupling points.

9. The air flap device according to claim 1, also comprising a spring-elastic biasing arrangement which in one of the two flap positions, in particular the closed position, exerts a bias on the air flap in the direction away from the other position.

10. The air flap device according to claim 9, wherein the biasing arrangement comprises a biasing element which is active between the air flap and a flap housing supporting the air flap so that it can rotate about the first axis of rotation.

11. The air flap device according to claim 9, wherein the biasing arrangement comprises a biasing element which is active between the air flap and the force transmission member.

12. The air flap device according to claim 9, wherein the biasing arrangement comprises a biasing element which is active between the force transmission member and the rotary member.

13. The air flap device according to claim 1, wherein the rotary member is formed in the shape of a disc.

14. The air flap device according to claim 1, wherein the flap operating mechanism also comprises an electric drive motor which drives the rotary member about the second axis of rotation and is designed for operation in opposite directions of rotation.

15. The air flap device according to claim 1, also comprising at least one elastic cushion element which is active between the air flap and an opening edge of the air passage opening for tightly closing the air passage opening when the air flap is in the closed position.

16. An air flap device for a cooling or/and freezing appliance of kitchen equipment, the device comprising:

an air flap which is mounted so that it can pivot about a first axis of rotation between an open position and a closed position, wherein the air flap uncovers an air passage opening for the passage of air in the open position;

a gap defined between the air flap and the air passage opening when the air flap is in the closed position;

at least one elastic cushion element disposed entirely over only one air flap surface of the air flap, the at least one elastic cushion element being compressed against the air passage opening when the air flap is in the closed position thereby blocking the air passage opening against the passage of air; and a motor-driven flap operating mechanism for pivoting the air flap, the flap operating mechanism comprising:

a rotary member which is disposed so as to be driven about a second axis of rotation, wherein the rotary member is free to rotate without limits and when circling the second axis of rotation alternately passes through two dead centre positions, in one of which the air flap is in its open position and in the other of which the air flap is in its closed position; and a separate force transmission member, which serves to transmit force between the rotary member and the air flap, is coupled to the rotary member at a point lying eccentrically to the second axis of rotation and is coupled to the air flap at a point lying at a distance from the first axis of rotation wherein the coupling of the force transmission member to the rotary member and/or the air flap is accomplished through a pin-slotted hole pair to provide mobility of play in the direction of a connecting line between the coupling points on the rotary member and air flap side.

* * * * *